No. 857,256. PATENTED JUNE 18, 1907.
F. E. PRATT.
VEHICLE SPRING.
APPLICATION FILED MAR. 21, 1906.
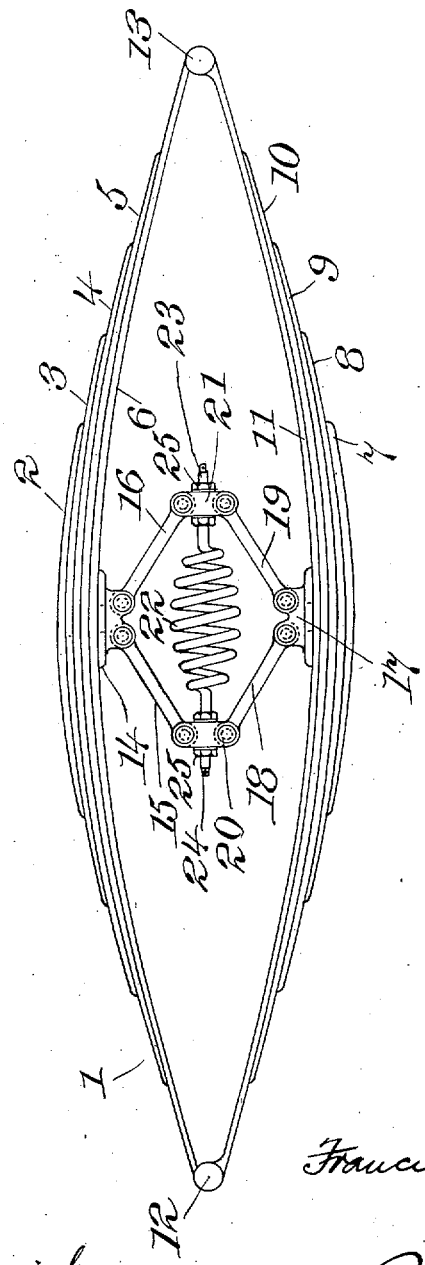
WITNESSES:
Francis Edward Pratt.
INVENTOR
By A. Parker Smith
ATTORNEY

UNITED STATES PATENT OFFICE.

FRANCIS EDWARD PRATT, OF NEW ROCHELLE, NEW YORK.

VEHICLE-SPRING.

No. 857,256.　　　Specification of Letters Patent.　　　Patented June 18, 1907.

Application filed March 21, 1906. Serial No. 307,251.

*To all whom it may concern:*

Be it known that I, FRANCIS EDWARD PRATT, a citizen of the United States of America, and a resident of New Rochelle, county of Westchester, State of New York, have invented certain new and useful Improvements in Vehicle-Springs, of which the following is a specification.

My invention relates to supporting devices for vehicles, and more specifically consists of an improved form of spring for supporting said vehicles, absorbing shock and vibration and preventing excessive vibration and breakage of the springs due to the sharp recoil of the ordinary form of spring when the wheel goes over a large obstruction.

The best form of apparatus embodying my invention at present known to me is shown in the accompanying drawing which is a side elevation of an apparatus embodying my invention, in which 1 represents the ordinary form of elliptical leaf spring composed of a series of upper leaves, 2, 3, 4, 5, 6, and a series of lower leaves, 7, 8, 9, 10, 11. The two sets of leaves are jointed at 12 and 13, so as to form an approximately elliptical structure. The spring of course supports the weight of the vehicle on its upper side and rests upon the axle or similar support attached to the wheel frame, all in the usual way.

On the inner side of the upper leaf attached to the inner leaf 6 in any convenient manner, is a suitable bearing block 14, to which is pivoted in any convenient manner, two swinging links 15 and 16. In the same way, to the under section of the spring, the inner leaf 11 thereon is connected to the bearing block 17. To this is pivoted the swinging links 18 and 19. The outer or free ends of the swinging links are connected together by short blocks 20 and 21. The said blocks are pivotally connected to the links so as to join the free ends of the opposite links. These blocks 20 and 21 are connected together by a stiff powerful spiral spring 22 extending diagonally across the quadrilateral figure formed by the four swinging links. This spring 22 is preferably made in the shape of a so-called "keg" spiral, and has its outer ends screw threaded, as shown at 23 and 24. Nuts 25, 25, &c. mesh with these screw threads upon the ends of the spiral spring and clasp the respective blocks 20 and 21 between them.

The operation of my invention is as follows: The parts are so designed preferably that when the elliptical spring is deflected, the amount corresponding to the normal weight which it is to carry, the short stiff spiral spring shall be in a condition of equilibrium without distortion or stress either of compression or distention. When a shock of any kind, such as is produced by the wheel passing over an obstacle, causes an abnormal compression of the elliptical spring, the spiral spring is then immediately thrown into a condition of distortion by distention, the free ends of the swinging links being forced away from one another by the link action. This enables the spiral spring to assist the elliptical spring in resisting further distortion. Furthermore, when extreme compression of the elliptical spring occurs, the second spiral or keg-shaped spring is actually compressed radially between the approaching halves of the elliptical spring, or the links of the quadrilateral controlled thereby. Said keg-shaped spring being located in the same plane as the jointed system of links is necessarily compressed between them when the quadrilateral is flattened beyond a certain point. In this way, the spiral or keg-shaped spring interposes the great stiffness and resistance of its coils to radial compression and acts as an ultimate buffer for the load when the main spring is compressed to an extreme degree. When the elliptical spring reacts and springs back to a position on the other side of its normal position tending to throw the vehicle up in the air, and also to break the inner unsupported leaves of the elliptical spring by the shock of the recoil, the spiral spring is immediately subjected to a powerful compressing action, which increases rapidly as the degree of separation of the two parts of the elliptical spring increases and this checks the recoil and rebound of the elliptical spring, protects it from fracture, and produces a great saving in the wear and tear on the vehicle, besides contributing to the comfort of the occupants.

It is evident, of course, that other forms of connecting mechanism might be substituted for the link mechanism to produce the above described result and that different forms of spring might be substituted for the particular form of spiral spring shown.

The invention might be employed with vehicle supporting springs of other than elliptical variety, and various other changes in the details of construction made without departing from the spirit and scope of my invention.

Having described my invention, I claim:

1. In a supporting device for vehicles the combination of the main spring, a pair of links pivoted thereto, a stiff double acting spring connecting the other ends of said links, and means for compelling the ends of said links so connected to the double acting spring to separate one from the other as the main spring is deflected and to approach one another as the main spring reacts from such deflection.

2. In a supporting device for vehicles the combination of an elliptical spring, a quadrilateral jointed system of links having opposite corners connected to the two parts of the elliptical spring and a second stiff double-acting spring connecting the other two corners of the quadrilateral system.

3. In a supporting device for vehicles the combination of an elliptical spring, a quadrilateral jointed system of links having opposite corners connected to the two parts of the elliptical spring and a second spring connecting the other two corners of the quadrilateral system, said second spring being a keg shaped spring of great stiffness, located in the same plane as the jointed system of links.

4. In a supporting spring for vehicles the combination of an elliptical leaf spring, a pair of links pivotally attached to the inner leaf of each side of the spring, two short blocks pivotally connecting the opposite free ends of the links and a spiral spring connecting said blocks, said spiral spring having screw threaded ends passing through said blocks, and nuts meshing with said threads, each block being clasped between the two nuts on one end of the spiral spring.

Signed at New York, N. Y., this 16 day of March, 1906.

FRANCIS EDWARD PRATT.

Witnesses:
FRANK O'CONNOR,
M. G. CRAWFORD.